(12) United States Patent
Asada

(10) Patent No.: US 7,014,064 B2
(45) Date of Patent: Mar. 21, 2006

(54) PIECE FEEDER

(76) Inventor: Tetsuya Asada, 1201-1, Higashikaizuka, Iwata-shi, Shizuoka-Ken (JP)

( * ) Notice: Subject to any disclaimer, the term of this patent is extended or adjusted under 35 U.S.C. 154(b) by 299 days.

(21) Appl. No.: 10/328,601

(22) Filed: Dec. 22, 2002

(65) Prior Publication Data

US 2003/0121832 A1    Jul. 3, 2003

(30) Foreign Application Priority Data

Dec. 31, 2001  (JP) .............................. 2001-403202

(51) Int. Cl.
    *B65G 59/00*    (2006.01)
(52) U.S. Cl. ...................... 221/277; 111/184
(58) Field of Classification Search ............... 221/277, 221/166, 237; 111/177, 184, 183, 178
    See application file for complete search history.

(56) References Cited

U.S. PATENT DOCUMENTS

| | | | | |
|---|---|---|---|---|
| 2,601,570 A | * | 6/1952 | Suthers | ..................... 221/212 |
| 2,690,856 A | * | 10/1954 | Trondle | ..................... 221/183 |
| 6,273,010 B1 | * | 8/2001 | Luxon | ........................ 111/184 |

\* cited by examiner

*Primary Examiner*—Kenneth Noland

(57) ABSTRACT

A piece feeder comprising a rotating cylindrical bowl (3) with an aligning track (2) on its upper edge which is driven by a motor in a cylindrical outer housing (1) and having a piece lifter (4) which is attached to the outer housing with constant clearance from the bowl periphery (32). The piece lifter has a slope on its upper edge that starts at or below the bowl bottom (33) and ends at the aligning track. Pieces are pushed up onto the piece lifter continuously by trigger pins (5) that are placed at the foot of the bowl periphery and at the skirt of the bottom bowl of the rotating bowl. Pieces are then pushed up to the aligning track by the following piece.

6 Claims, 5 Drawing Sheets

// PIECE FEEDER

BACKGROUND OF INVENTION

Oscillation is widely utilized for this type of piece feeder while some use a rotating mechanism to reduce vibration. But both have the following problems.

Conventional Vibration Types:

1) They make loud noise because of vibration to deteriorate working environment.
2) The bowls are easily worn down by abrasion. Thus, the running cost rises
3) Feeding speed of the pieces vary according to the fluctuation of the power voltage.
4) They are not economical because they consume much electricity to operate.

Conventional Rotating Type:

5) The initial and running cost is expensive because the structure is complicated and difficult to operate and maintain.
6) A piece has to travel a long distance because the apparatus sends the pieces by inclined rotation.
7) The variety of pieces is limited because the structure confines its versatility

SUMMARY OF INVENTION

The object of this invention is to provide a piece feeder without vibration nor noise, having stable feeding capability and high versatility as well as low possibility of damaging the pieces also less energy-consumption by solving many problems of prior arts as stated above.

BRIEF DESCRIPTION OF THE DRAWINGS

The invention disclosed herein can be well understood with reference to the following drawings which are:

FIG. 5B—a view in the direction of "Z" in FIG. 5A

Referring to the drawings, reference characters designate corresponding parts throughout several views as follows:

1 outer housing, 11 housing retainer, 13 drain plug, 14 auxiliary outer housing, 2 aligning track, 21 slot, 3 cylindrical bowl, 31 bowl cap, 32 bowl periphery, 33 bowl bottom, 34,34a,34b groove, 38 bolt, 39 screw, 4,4a,4b,4c piece lifter, 41 stay, 46 plate, 47 rib, 5,5a,5b,5c trigger pin, 6 guide, 61 guide bracket, 8 drive shaft, 81 bearing, 82 cam follower, 83 coupling, 84 driving motor, 85 controller, 9 footing, 91a, 91b pillar, 92 motor attachment, 93 cover, 94 basement, "A" piece

DETAILED DESCRIPTION OF THE INVENTION

Figure 1:
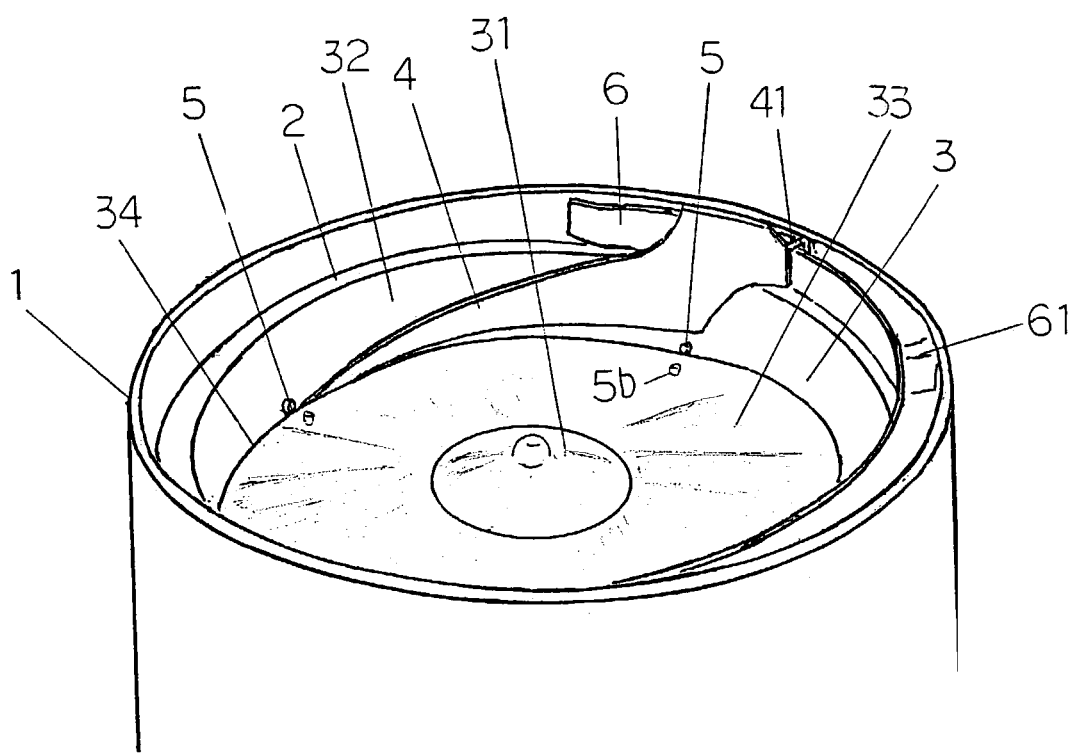
FIG. 1—a perspective illustration of the primary part of example "-1"
Figure 2:
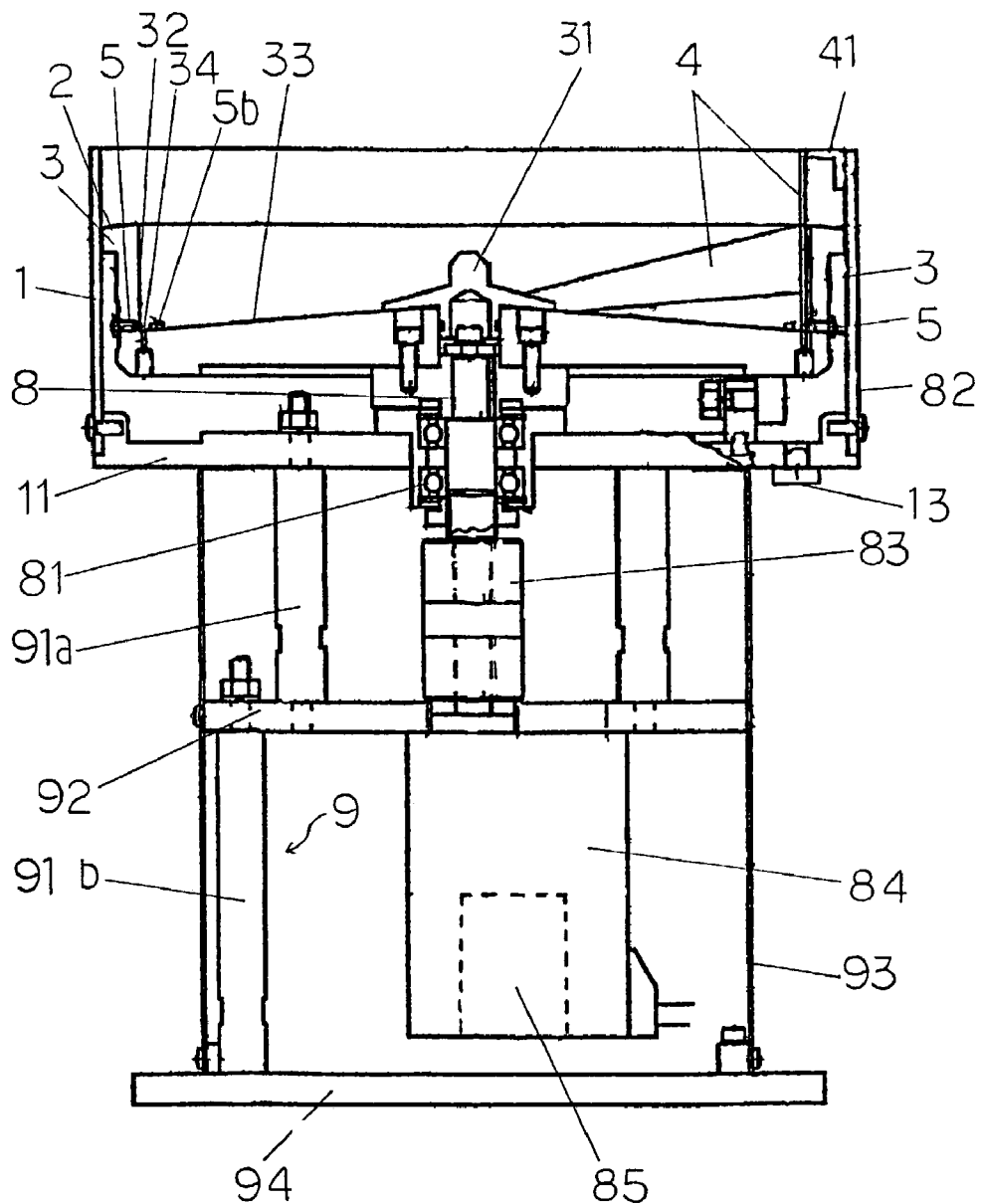
FIG. 2—a cross sectional overview of the feeder in FIG. 1

An embodiment of the invention will now be described by way of examples and with references to the accompanying drawings, which are:

FIG. 1 is a perspective illustration of the primary part of example "-1" that a roller pin is applied as a piece to the piece feeder. FIG. 2 is a cross-sectional overview of FIG. 1

A cylindrical bowl (3) is attached to a driving motor as illustrated in FIG. 1. The cylindrical bowl rotates in a cylindrical outer housing keeping a constant clearance. The cylindrical bowl has an aligning track (2) whose outer edge is lower than its inner edge on the whole upper edge of the cylindrical bowl with a width such roller pin "A" can rotate several times outside.

The bottom surface of the cylindrical bowl is smoothly formed in a cone with material such as plastic. The piece lifter (4) made of stainless steel is attached to the outer housing (1) with a stay (41).

The piece lifter is a round plate along the surface of the bowl periphery (32) which keeps a constant clearance, that is a distance of 20 or 30 percent less than the diameter of the roller pin (A), between the cylindrical bowl (3) and bowl periphery (32). The trigger pins are mounted on the cylindrical bowl in the positions that divide the bowl periphery (32) in four near the bowl bottom (33). The trigger pins (5) are mounted and/or penetrate the cylindrical bowl from outside in a manner that they do not interfere with the piece lifter.

The trigger pins (5b), if necessary, can be mounted on the bowl bottom (33) near the bowl periphery according to the piece (A) at a right angle to the corresponding trigger pin (A) that is mounted on the bowl periphery (32).

The guide (6) is mounted on the aligning track (2) with the bracket (61). The guide is formed in a curve to send roller pins A that are carried to the aligning track (2) at the desired position. A guide plate or a slider may be mounted to align pieces (A) in the proper position for the requirement of the following process if necessary.

The cylindrical outer housing (1) is mounted along with the housing retainer on the footing (9), which comprises two types of pillars (91a,92b), the motor attachment (92) and the basement (94) as shown in FIG. 2. The cam followers (82) are attached under the cylindrical bowl (3) in a position that divides the circumference in four to stabilize rotation of the cylindrical bowl (3). The drive shaft (8) of the cylindrical bowl (3) is connected to the driving motor (84) by the bearing (81) and the coupling (83). The controller (85) varies the speed of the driving motor (84).

The pieces in the bowl go down to the bottom corner of the bowl periphery (32) on the bowl cone when the cylindrical bowl rotates. The pieces are pushed up on the upper edge of the piece lifter by the trigger pins. The rotating triggers on the cylindrical bowl successively feed only pieces in the correct position. The pieces align on the piece lifter by pushing up preceding the piece. The first piece of the aligned row moves on the aligning track (2) when it climbs up the bowl periphery (32) to the height of the aligning track (2).

Then the pieces (A) are carried on the rotating aligning track (2) along the circumference of the guide (6). The pieces are aligned in the desired position for the following process. The pieces in an inadequate position are dropped in the bowl while they travel on the track.

Figure 3A:
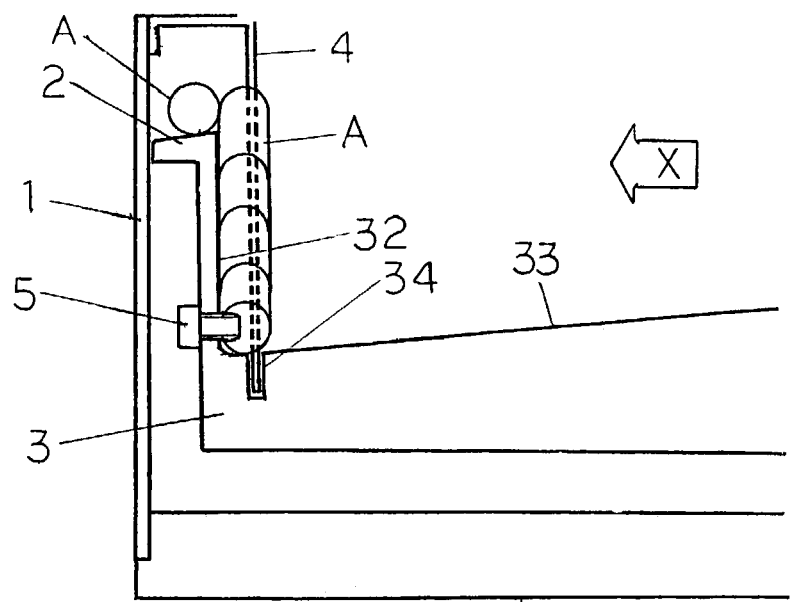
FIG. 3A—a sectional view of the primary part that illustrates the feeding mechanism of this invention FIG. 3B—a view in the direction of "X" in FIG. 3A FIG. 4—a cross sectional view of the primary part of example "-2"
Figure 3B:
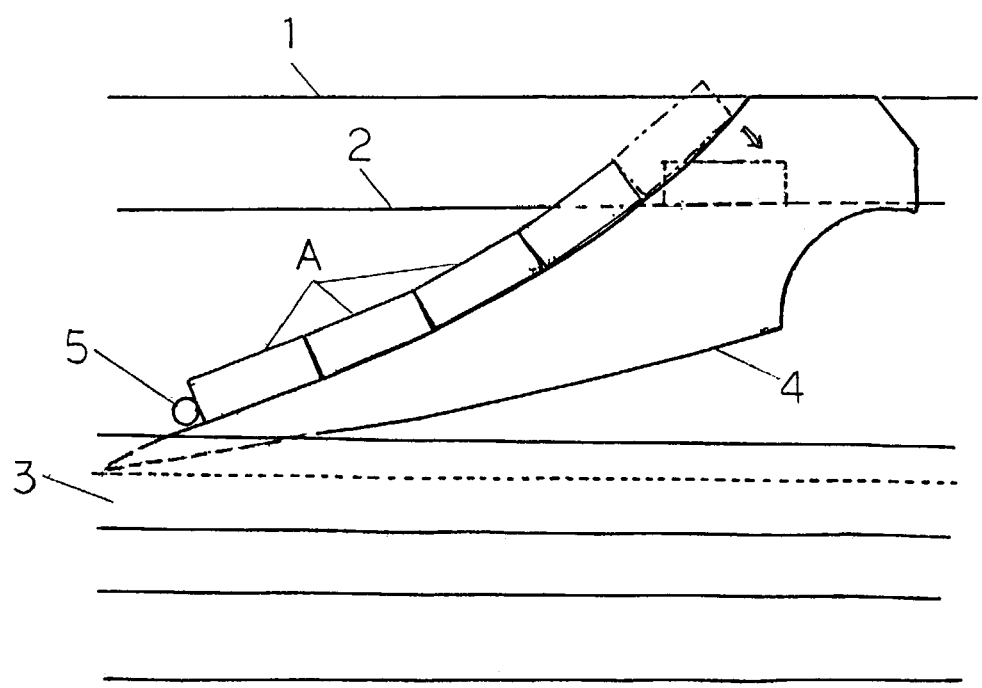

FIG. 3A is a sectional view of the primary part of the cylindrical bowl that illustrates the feeding mechanism of this invention. FIG. 3B is a view in the direction of "X" in FIG. 3A. The material point is that the center of gravity of the piece is placed between the rotating bowl periphery (32) and the piece lifter as illustrated in FIG. 3. Friction force is very small because the pieces are lifted up (but not completely) by two lines. The pieces can climb up even if they form a row when the trigger pin (5) pushes them from the bottom.

The position of the piece is altered through the climbing stage on the piece lifter (4) to the aligning track (2). The position of the piece can be manipulated by adjusting the angle of the upper edge of the piece lifter. Thus, many pieces can be fed efficiently.

This example comprises a groove (34) at the bowl bottom (33) to accommodate the lower edge of the piece lifter (4). The groove (34) can be removed for large pieces.

This drawing only demonstrates an example that comprises of a one piece lifter (4) which is attached to the circumference of the outer housing. A large sized piece feeder can be equipped with more than one piece lifter symmetrically or at regular intervals.

Figure 4:
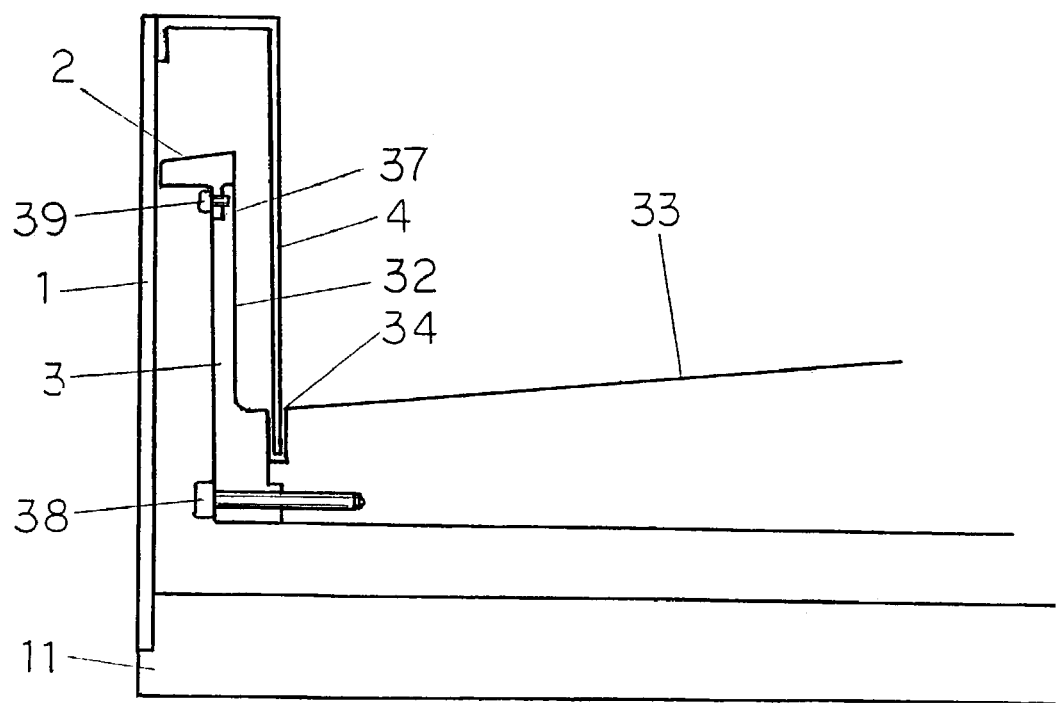

FIG. 4 is a cross sectional view of the primary part of example "-2". The cylindrical bowl can be disassembled to components. A bottom component that comprises the bowl bottom (33) of the cylindrical bowl (3), and a cylinder component that comprises bowl periphery (32), and a ring plate component which comprises the aligning track at the upper edge of the cylinder, are assembled through a flange (37). The bolt (38) or screw (39) fastens the structure.

The craftsmanship excellence of this structure is that the aligning track (2) can be replaced when it is worn down or the type of the pieces are changed. The cylinder component or the bottom component can be replaced when the bowl periphery (32) is worn down, which can reduce running cost of the operation. The bottom and the periphery of the cylindrical bowl can be separated to rotate at different speeds.

Figure 5A:
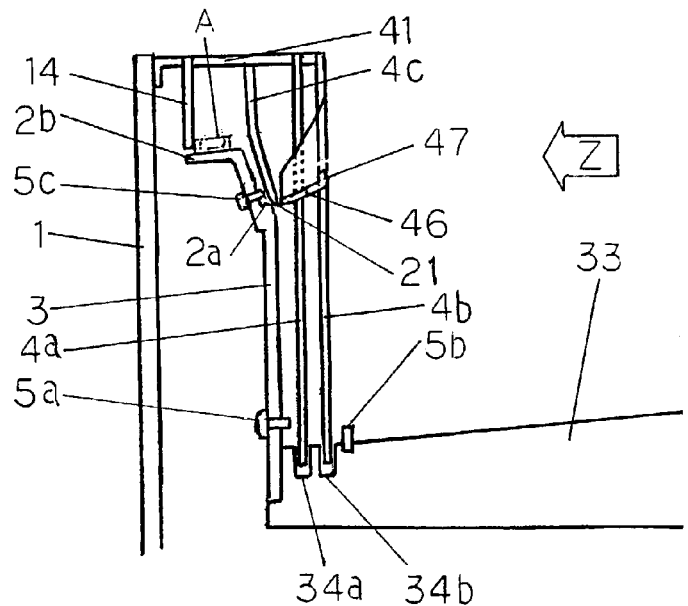
FIG. 5A—an enlarged cross-sectional view of the primary part of example "-3"
Figure 5B:
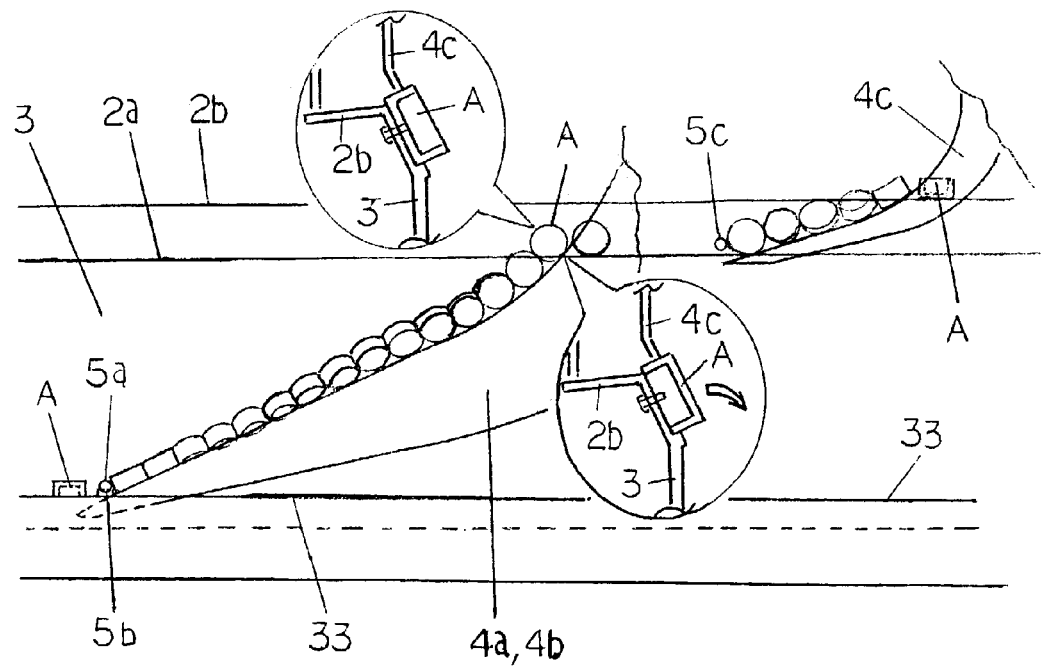

FIG. 5A is a view of the primary part of example "-3", which comprises more than one-piece lifters, and two stages of aligning tracks. FIG. 5B illustrates its mechanism in the direction of "Z" in FIG. 5A.

Piece lifters (4A) are attached in parallel and plate (46) is placed above them. The rib (47) is attached through the entire inner perimeter of the plate (46). The plate (46) has a smoothly machined slope that increases steepness gradually up to near a right angle to align or orientate pieces in the desired position according to the lift.

The plate (46) surface can be polished or coated by plastics such as TEFLON to let pieces slide smoothly.

The feeder can be applied to a wide variety of sizes, shapes, alignments and positions of pieces. The feeder can run at high speed, which in turn reduces friction of the lifter surface to raise efficiency of the process.

There can only be a one-piece lifter or the plate (46) at the top of the piece lifter can be removed according to the type of pieces used.

Piece lifter (4A) and piece lifter (4B) are placed in parallel inside of the cylindrical bowl (3) and piece lifter (4C) is placed outside of the cylindrical bowl (3). Two stages of aligning tracks (2) are attached as shown in FIG. 5. The lower end of the outer piece lifter (4B) is submerged in a circular slot (21) that is engraved in the first aligning track (2A) in place of groove (34). A trigger pin (5C) is mounted on the sidewall of the second stage track (2B) with a length that does not contact the piece lifter (4B).

Two-stage tracks and two kinds of piece lifters are applied for this example, which can be identified in FIG. 5B. This method, for instance, is effective for an application when the piece (A) is a cap-like shape and the position of the piece is altered after it is once picked up.

FIG. 5B demonstrates this mechanism. The trigger pins push piece caps (A) in the both face down and face up position up on the piece lifter (4A,4B) continuously. Caps tilt up gradually to the upright position while they climb up the piece lifter to the first stage-aligning track (2A).

Cap (A) which faces outside, falls into the cylindrical bowl (3) This is because its center of gravity is out of the track. Cap (A) which faces inside, stays on the track to be selected and moves to the aligning track (2A)

Caps are pushed by the trigger pin (5C) and they change their position from an unstable upright position to a stable face-up position to be taken out while they climb up the piece lifter (4C) to the aligning track (2B).

The aligning track can comprise an "L" shape arch with an edge or gradual slanted angle variation throughout the track.

This configuration exhibits high versatility and efficiency in an application such as feeding bolts in an upright position or a selection using gravity unbalanced under an inclined position or restoring a position of a piece after it is once altered.

Covering a requirement to feed a large amount of pieces into the bowl by installing an auxiliary instrument such as a funnel or cylinder in or above the bowl does not effect any requirement of this configuration.

What is claimed is as follows:

1. An apparatus for feeding pieces having:
   a) a cylindrical bowl connected to a driving motor with a smooth cone shaped bottom, rotating in an outer housing keeping a clearance from the same housing having an aligning track on its whole upper edge, and:
   b) a piece lifter, which is an upright plate curving along the bowl periphery of the said cylindrical bowl, keeping a constant distance (clearance) from the bowl periphery, mounted on the outer housing having a smooth slope on its upper edge that connects the vicinity of the bowl bottom and the aligning track at the lowest portion, and:
   c) The lowest part of the slope at the upper edge of the said piece lifter is lower than the bowl bottom of said cylindrical bowl, and
   d) A circular groove or an equivalent slot is engraved on the bowl bottom whose width is that cylindrical bowl does not touch piece lifter on the trace of said circular groove or slot where the lowest edge contacts the bowl bottom when the cylindrical bowl rotates with the lowest edge being submerged in said grove or slot in the bowl bottom.

2. The apparatus as claimed in claim 1, in which the upper edge of the piece lifter is slanted outward from the cylindrical bowl.

3. The apparatus as claimed in claim 1, in which more than one piece lifters are attached to the outer housing in parallel.

4. The apparatus as claimed in claim 1, in which more than one circular groove or equivalent slot are engraved along with the said piece lifters, having enough width providing the piece lifter does not contact the cylindrical bowl, when the cylindrical bowl rotates, while the lowest edge of the said piece lifters are submerged in the bowl bottom.

5. The apparatus as claimed in claim 1:
a) two stages of aligning tracks are equipped, and:
b) a circular groove or equivalent slot is engraved on the first stage aligning track on its whole upper edge of the cylindrical bowl, and:
c) more than one-piece lifter is coupled like a cascade.

6. An apparatus for feeding pieces having:
a) a cylindrical bowl connected to a driving motor with a smooth cone shaped bottom, rotating in an outer housing keeping a clearance from the same housing having an aligning track on its whole upper edge, and:
b) a piece lifter, which is an upright plate curving along the bowl periphery of the said cylindrical bowl, keeping a constant distance (clearance) from the bowl periphery, mounted on the outer housing having a smooth slope on its upper edge that connects the vicinity of the bowl bottom and the aligning track at the lowest portion, and:
c) The lowest part of the slope at the upper edge of the said piece lifter is lower than the bowl bottom of said cylindrical bowl, and
d) A circular groove or an equivalent slot is engraved on the bowl bottom whose width is that cylindrical bowl does not touch piece lifter on the trace of said circular groove where the lowest edge contacts the bowl bottom when the cylindrical bowl rotates with the lowest edge being submerged in said groove or slot in the bowl bottom, and:
e) In which a smooth plate is attached to the upper edge of the said piece lifter.

* * * * *